US011474859B2

(12) United States Patent
Poledna et al.

(10) Patent No.: US 11,474,859 B2
(45) Date of Patent: Oct. 18, 2022

(54) METHOD, DEVICE, AND REAL-TIME NETWORK FOR HIGHLY INTEGRATED AUTOMOTIVE SYSTEMS

(71) Applicant: TTTech Auto AG, Vienna (AT)

(72) Inventors: Stefan Poledna, Klosterneuburg (AT); Wilfried Steiner, Vienna (AT)

(73) Assignee: TTTECH AUTO AG, Vienna (AT)

( * ) Notice: Subject to any disclaimer, the term of this patent is extended or adjusted under 35 U.S.C. 154(b) by 491 days.

(21) Appl. No.: 16/421,570

(22) Filed: May 24, 2019

(65) Prior Publication Data

US 2019/0361736 A1    Nov. 28, 2019

(30) Foreign Application Priority Data

May 25, 2018   (EP) ...................................... 8174294

(51) Int. Cl.
*G06F 9/46*      (2006.01)
*G06F 9/48*      (2006.01)
(Continued)

(52) U.S. Cl.
CPC ........ *G06F 9/4881* (2013.01); *G06F 9/45558* (2013.01); *G06F 9/5077* (2013.01);
(Continued)

(58) Field of Classification Search
CPC .... G06F 9/4881; G06F 9/4558; G06F 9/5077; G06F 9/45558; H04L 12/40
See application file for complete search history.

(56) References Cited

U.S. PATENT DOCUMENTS

2016/0185222 A1   6/2016  Ricci et al.
2017/0021839 A1*  1/2017  Satyavolu ........... B60W 50/085
(Continued)

FOREIGN PATENT DOCUMENTS

EP          3101535 A1    12/2016

OTHER PUBLICATIONS

Leiner et al., "A Comparison of Partitioning Operating Systems for Integrated Systems", Sep. 18, 2007, Computer Safety, Reliability, and Security; [Lecture Notes in Computer Science], Springer Berlin Heidelberg, Berlin, Heidelberg, pp. 342-355.
(Continued)

*Primary Examiner* — Tammy E Lee
(74) *Attorney, Agent, or Firm* — Eversheds Sutherland (US) LLP

(57) ABSTRACT

A method for integrating infrastructure software functions and automotive applications on an automotive electronic control unit (ECU) device. The ECU device includes a hardware architecture and a software architecture, wherein the hardware architecture includes two or more system-on-chips, at least two of which each comprise two or more processing cores and means to communicate with at least one other system-on-chip. The hardware architecture includes memory and means to communicate with other ECU devices. The software architecture includes one, two, or more virtual machine monitors, each of which executes one, two, or more virtual machines. At least two of said virtual machines each execute an operating system, which executes one, two, or more tasks, and the execution of two or more of the tasks uses the time-triggered paradigm. The tasks are tasks of automotive applications from at least two different automotive domains and are tasks of infrastructure software functions.

19 Claims, 2 Drawing Sheets

(51) Int. Cl.
    *G06F 9/455*     (2018.01)
    *G06F 9/50*     (2006.01)
    *H04L 12/40*     (2006.01)

(52) U.S. Cl.
    CPC .... *H04L 12/40* (2013.01); *G06F 2009/45591* (2013.01); *H04L 2012/40273* (2013.01)

(56) References Cited

U.S. PATENT DOCUMENTS

2018/0107507 A1    4/2018   Lin et al.
2019/0258251 A1*  8/2019   Ditty .................. G06K 9/00805

OTHER PUBLICATIONS

Reinhardt et al., "Achieving a Scalable E/E-Architecture Using AUTOSAR and Virtualization", SAE Int J. Passeng. Cars-Electron. Electr. Syst. 6(2): 2013, pp. (Apr. 8, 2013).

Anonymous: "System on a chip—Wikipedia" May 17, 2018 (May 17, 2018), Retrieved from: URL: https://en.wikipedia.org/w/index.php?title=System on a chip&oldid=841648605 [retrieved on Feb. 25, 2019].

\* cited by examiner

METHOD, DEVICE, AND REAL-TIME NETWORK FOR HIGHLY INTEGRATED AUTOMOTIVE SYSTEMS

CROSS-REFERENCE TO RELATED APPLICATIONS

This application claims priority to European Patent Application No. 18174294.1, filed May 25, 2018, which is incorporated herein by reference.

TECHNICAL FIELD

The invention relates to a method for integrating infrastructure software functions and automotive applications on an automotive ECU device, wherein the ECU device comprises a hardware architecture and a software architecture. Furthermore, the invention relates to an automotive ECU device, wherein the ECU device comprises a hardware architecture and a software architecture.

BACKGROUND

According to the state-of-the-art in automotive electronics, automotive applications are packaged into devices, so called electronic control units (ECUs)—ECU devices—, which are combined software/hardware units. Examples of automotive applications are advanced driver assistance systems, as for example an electronic stability program, automated emergency breaking, adaptive cruise control, adaptive light control, lane departure warning systems, night vision, tire pressure monitoring, intelligent speed adaption, etc. Other examples of automotive applications are autonomous driving or semi-autonomous driving. Typically, a new automotive application is added to an automobile by adding a new ECU device. Hence, as the automotive applications in the car grow more and more, the number of ECU devices has reached a critical limit with well beyond a hundred ECU devices in top-of-the-line cars. This high number of ECU devices is not cost efficient as each of the ECU devices requires housing, power supply, space in the car and also adds to the car's weight.

Furthermore, a multitude of ECU devices needs to execute the same or similar infrastructure software functions such as communication middleware, system diagnosis functions and/or management functions, which is inefficient. Furthermore, multiple ECU devices also often need to execute multiple operating systems, which is inefficient.

It would be desirable to provide a novel method to reduce the number of ECU devices per car and to tightly integrate infrastructure software functions and automotive applications on one or few, preferably powerful ECU devices.

SUMMARY

A novel approach to realize automotive electronic systems is provided. In embodiments, this is achieved with a method in which the hardware architecture comprises two or more system-on-chips, and wherein at least two of said system-on-chips each comprise two or more processing cores and means to communicate with at least one other system-on-chip, and wherein the hardware architecture comprises memory and means to communicate with other ECU devices, and wherein the software architecture comprises one, two, or more virtual machine monitors, and wherein each of said virtual machine monitors executes one, two, or more virtual machines, and wherein at least two of said virtual machines each execute an operating system, and wherein the operating system executes one, two, or more tasks, and wherein the execution of two or more of the tasks uses a time-triggered paradigm, and wherein tasks are tasks of automotive applications from at least two different automotive domains and are tasks of infrastructure software functions.

This may also be achieved with an ECU device mentioned in the introduction, wherein according to the invention the hardware architecture comprises two or more system-on-chips, and wherein at least two of said system-on-chips each comprise two or more processing cores and means to communicate with at least one other system-on-chip, and wherein the hardware architecture comprises memory and means to communicate with other ECU devices, and wherein the software architecture comprises one, two, or more virtual machine monitors, and wherein each of said virtual machine monitors is configured to execute one, two, or more virtual machines, and wherein at least two of said virtual machines each are configured to execute an operating system, and wherein the operating system executes one, two, or more tasks, and wherein the execution of two or more of the tasks uses the time-triggered paradigm, and wherein tasks are tasks of automotive applications from at least two different automotive domains and are tasks of infrastructure software functions.

A novel approach is provided to integrate infrastructure software functions and automotive applications on a single highly-integrated automotive ECU device as well as to coordinate infrastructure software functions and automotive applications that reside on different devices by means of a real-time network connecting said ECU devices. Each infrastructure software function and each automotive application may be realized by one, two, or a multitude of tasks. The invention may make use of one, two, or a multitude of virtual machine monitors, where each virtual machine monitor enables the execution of one, two, or a multitude of virtual machines. A virtual machine may execute an operating system and the operating system may execute one, two, or a multitude of tasks.

A virtual machine may alternatively execute one, two, or a multitude of tasks directly without the use of an operating system. The novel integration approach uses the time-triggered paradigm for task execution, and preferably also for the communication between tasks (task communication). The use of the time-triggered paradigm for the task execution, and preferably for task communication, allows to sequentially execute tasks tightly back to back, while the tasks may be residing on one or many virtual machines, one or many system-on-chips within an ECU device as well as tasks residing on two or many ECU devices. Hence, the use of the time-triggered paradigm enables to exceed the state-of-the-art so as to tighter integrate tasks in an ECU device while also providing real-time and fault-tolerance behavior of said tasks.

Furthermore, the invention allows to integrate automotive applications from different automotive domains on a single highly-integrated automotive ECU device. Such automotive domains are for example: autonomous driving, gateway, connectivity, infotainment, body, energy, chassis, and powertrain. The use of the time-triggered paradigm enables this integration, as interferences between applications from different domains can be precisely controlled and avoided as necessary.

Preferably, one, two, or a multitude of infrastructure software functions may operate as shared management functions to reduce the overall number of tasks in the ECU device. Examples of shared management functions are functions that modify the configuration of the time-triggered paradigm. Other examples of shared management functions include tasks that execute updates of infrastructure software functions and/or automotive applications as for example new releases of automotive applications or security updates. Other examples of shared management functions are tasks that accept new infrastructure software functions and/or new applications from outside of the automobile, e.g., as received through vehicle-to-infrastructure communication which may be realized by mobile communication techniques such as 3G, 4G, or 5G, and deploy said new infrastructure software functions and/or applications in the ECU device. Another set of examples of shared management functions are tasks that diagnose infrastructure software functions and/or automotive applications that are executed on the ECU device and which report diagnostic information, for example to a storage that resides inside the automobile and/or resides outside the vehicle, where in the latter case the transmission from the automobile to the outside storage may be executed by means of vehicle-to-infrastructure communication and/or mobile communication techniques such as 3G, 4G, or 5G. Shared management functions serve two or more automotive domains.

The present invention discloses how (i) scheduling actions of one, two, or many virtual machine monitors, and (ii) scheduling actions of or within one, two, or many virtual machines, and, thus, the execution of one, two, or many tasks is coordinated by means of the time-triggered paradigm. Preferably, (iii) the communication of one, two, or many virtual machine monitors, virtual machines, and/or tasks residing on the same ECU device may use the time-triggered paradigm. Preferably, (iv) the communication between two or more ECU devices may use the time-triggered paradigm. Preferably, it is provided (v) to install one, two, or a multitude of the infrastructure software functions as shared management functions.

The time-triggered paradigm as mentioned above guarantees deterministic behavior of tasks executing, and preferably communicating, within the ECU device and between different ECU devices in the time domain. This deterministic behavior allows to integrate automotive applications and/or infrastructure software functions with different automotive safety integrity levels (ASIL) as well as automotive applications and/or infrastructure software functions with different real-time requirements on the same ECU device. In particular, the presented innovation allows a single ECU device to execute automotive applications and/or infrastructure software functions with different ASIL, e.g., ASIL A, ASIL B, ASIL C, ASIL D, and/or QM. For example, the ECU device may execute critical automotive applications, such as autonomous driving applications, that are classified as ASIL D as well as automotive applications that relate to in-vehicle infotainment that may be classified only as QM. In this example a set of shared management functions could manage both the autonomous driving application as well as the in-vehicle infotainment application. This management may include the update of the automotive applications to new automotive application versions and/or the modification of the configuration of the two automotive applications.

Advantageous embodiments of the method and of the ECU device described above are detailed hereinafter:
One, two, or a multitude of said tasks may realize shared management functions.
The communication of two or more of the tasks may use the time-triggered paradigm.
At least two tasks of said tasks that use the time-triggered paradigm may be executed on different cores of the same system-on-chips.
At least two tasks of said tasks that use the time-triggered paradigm may be executed on different system-on-chips.
A virtual machine may execute one, two, or a multitude of tasks directly without the use of an operating system.
The use of the time-triggered paradigm may relate to the scheduling decisions when tasks start to execute and when messages start to transmit.
According to the use of the time-triggered paradigm two or more cores in two or more system-on-chips may have access to a synchronized time, in particular to a data structure that represents a synchronized time, and start to execute two or more tasks at configured points in time with respect to said synchronized time, wherein the points in time with respect to said synchronized time at which points in time at least two tasks start to execute are configured, for example in memory and/or storage of the ECU device, and/or—for example—in local memories of the system-on-chips, and/or two or more cores in two or more system-on-chips may have access to a synchronized time, in particular to a data structure that represents a synchronized time, and may start to transmit one, two, or more messages at configured points in time with respect to said synchronized time, wherein the points in time with respect to said synchronized time at which points in time one, two, or more messages start to transmit may be configured, for example in memory and/or storage of the ECU device, and/or—for example—in local memories of the system-on-chips.
Said configured points in time of the two or more tasks may be sufficiently different from each other, such that any two tasks that are being executed on the same core of an system-on-chips will not timely overlap with their execution times.
According to the time-triggered paradigm, in order to enable the execution of tasks, activities of the virtual machine monitors, and/or virtual machines may be scheduled with respect to said synchronized time.

The invention also relates to system consisting of at least two such automotive ECU devices, wherein said ECU devices are connected to each other by means of a network, and wherein a first automotive ECU device of said at least two ECU devices is configured to execute a first set of automotive applications, and wherein a second ECU device of said at least two ECU devices is configured to execute a second set of automotive applications, and wherein in the case of a failure of said first automotive ECU device one, two, a multitude, or all automotive applications of said first set of automotive applications are replaced by the execution of said second set of applications located on said second automotive ECU device.

Preferably, a set of automotive applications contains at least one automotive application, preferably more automotive applications, wherein preferably the automotive applications of the first set are different from the automotive applications of the second set.

It may of advantage when the network that connects said at least two automotive ECU devices is any one or any combination of an Ethernet network, a PCIe network, a CAN network, a LIN network, a FlexRay network, a MOST network, or any other communication technology.

Finally, the invention relates to a real-time network comprising at least one such device and/or comprising at least one system mentioned above, and an automobile comprising at least one such device and/or comprising at least one system mentioned above, and/or comprising at least one real time network as mentioned before.

BRIEF DESCRIPTION OF THE DRAWINGS

In the following, in order to further demonstrate the present invention, illustrative and non-restrictive embodiments are discussed, as shown in the drawings, which show.

DETAILED DESCRIPTION

Some of the many implementations of the invention are described below. If not stated otherwise, all details described in connection with a specific example are not only valid in connection with this example, but apply to the general scope of protection of the invention.

Figure 1:
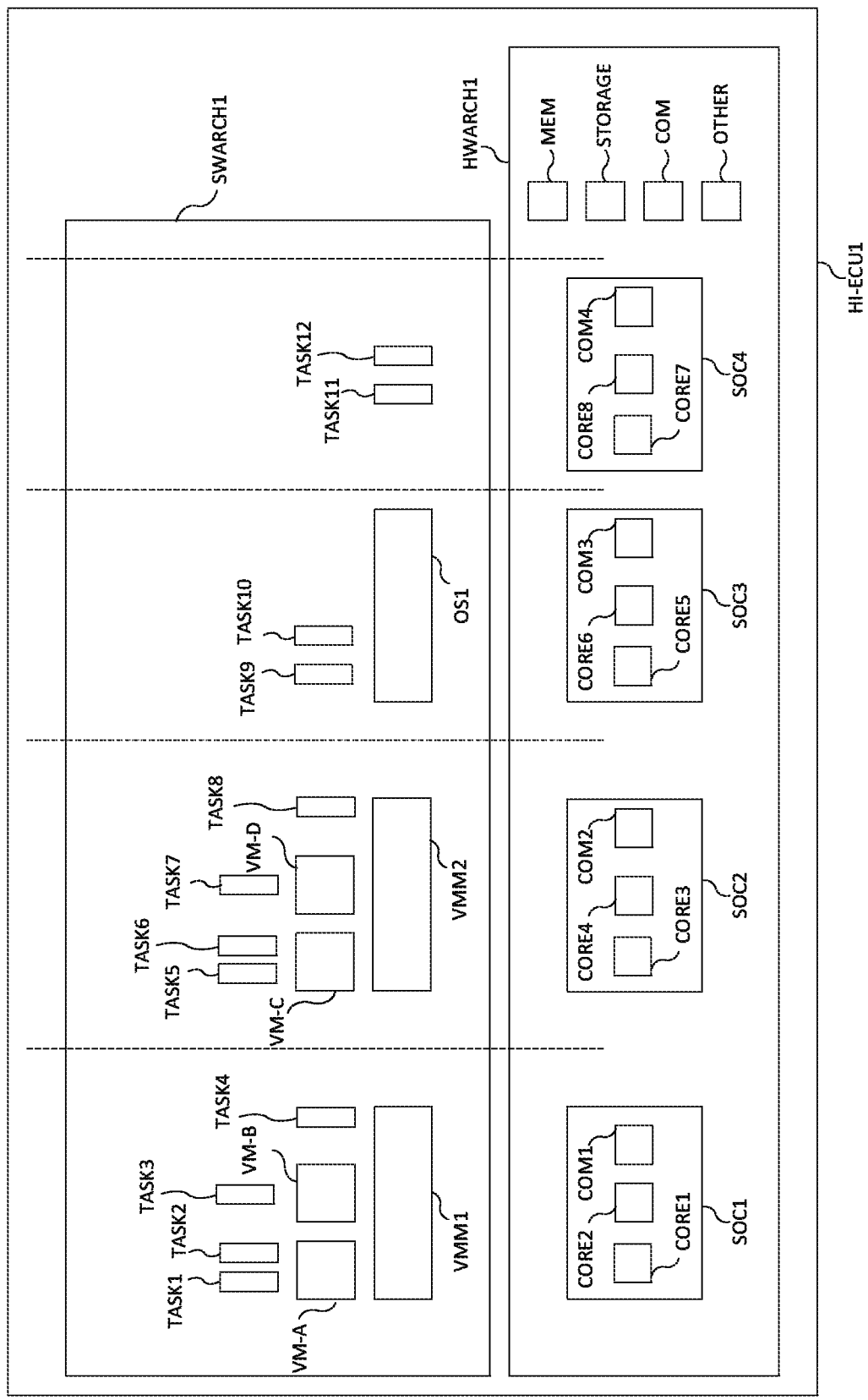
FIG. 1 an example structure of highly-integrated ECU device.

FIG. 1 depicts an example structure of an ECU device HI-ECU1, in particular a highly-integrated ECU device HI-ECU1. In this example realization, the ECU device HI-ECU1 is defined by a hardware architecture HWARCH1 and a software architecture SWARCH1. Typically, the ECU device HI-ECU1 is installed in an automobile.

The hardware architecture HWARCH1 comprises two or more system-on-chips, wherein in the example shown the hardware architecture comprises four system-on-chips SOC1-SOC4.

For example, the hardware architecture HWARCH1 may comprise two or more processors, wherein each system-on-chip may be realized by two or more of said processors. Each system-on-chip comprises a multitude of processing cores CORE1-CORE8 and means for communication COM1-COM4. Furthermore (not depicted), some or all system-on-chips SOC1-SOC4 optionally may also realize additional functionality such as graphics processing units (GPUs) or neuronal network co-processing units (NPUs).

Besides the system-on-chips, the hardware architecture may also include volatile and non-volatile memory MEM and may also contain storage capabilities STORAGE.

The hardware architecture HWARCH1 may also contain communication capabilities COM that allows the ECU device HI-ECU1 to communicate with other ECUs, in particular other ECU devices of the kind described in connection with FIG. 1. The communication capabilities COM may also include capabilities that enable the ECU device HI-ECU1 to communicate with components outside of the automobile.

Furthermore, other hardware elements OTHER may be part of the hardware architecture HWARCH1 as well.

The hardware architecture HWARCH1 may be designed to simplify hardware upgrades and/or hardware extensions. For example, all elements of the hardware architecture HWARCH1 may be integrated on a single printed-circuit board (PCB) or may be integrated on multiple PCBs with appropriate connections between the PCBs. In this latter case when multiple PCBs are used to realize the hardware architecture HWARCH1, then the extensibility and upgradability of HWARCH1 may be achieved by exchanging one, two, or a multitude of the many PCBs.

The software architecture SWARCH1 is realized by at least one virtual machine monitor VMM1, VMM2, that executes on at least one system-on-chip SOC1-SOC4. In the example shown two virtual machine monitors VMM1, VMM2 are provided. One or more of the virtual machine monitors VMM1, VMM2, preferably all virtual machine monitors, VMM1, VMM2, each implement one, two, or many virtual machines. In the example shown each virtual machine monitor VMM1, VMM2 implements two virtual machines VM-A, VM-B, VM-C, VM-D. At least one of the potentially many virtual machines VM-A, VM-B, VM-C, VM-D executes an operating system and said operating system (that is executed in one of potentially many virtual machines VM-A, VM-B, VM-C, VM-D that are implemented by one of potentially many virtual machine monitors VMM1, VMM2) executes one, two, or a multitude of tasks, e.g., virtual machine VM-A executes tasks TASK1, TASK2, virtual machine VM-B executes tasks TASK3, virtual machine VM-C executes tasks, TASK5, TASK6, and virtual machine VM-D executes taskTASK7. Other tasks, in addition, may also be directly executed on a virtual machine monitor VMM1, VMM2, e.g., tasks TASK4, TASK5.

The software architecture SWARCH1 may also include an operating system OS1 that executes directly on a system-on-chip without the intermediate layer of a virtual machine monitor. One, two, or a multitude of tasks TASK9, TASK10, may be executed by said operating system OS1.

The software architecture SWARCH1 may also include tasks TASK11, TASK12, that directly execute on a processor without an operating system and without a virtual machine monitor.

Some of the tasks TASK1-TASK12 may implement shared management services. For example in one realization TASK4 executes on the system-on-chip SOC1 and may be a task that receives update requests from outside the automobile for tasks TASK1, TASK2, wherein both tasks are also executing on said the system-on-chip SOC1. Furthermore, in another realization the task TASK4 may also receive update requests from the outside of the automobile for tasks TASK5, TASK6 that execute on a different system-on-chip SOC2. Task TASK4 may use the communication capabilities COM1, COM2 of the system-on-chips SOC1, SOC2 to communicate said update requests to tasks TASK5, TASK6.

In another realization, task TASK4 may alternatively communicate the update requests to task TASK8 on the system-on-chip SOC2 and task TASK8 may then execute the update requests that affect tasks TASK5, TASK6. In all of these example realizations it is only task TASK4 that communicates with the outside of the automobile and thus, task TASK4 is part of a shared service that the tasks TASK1, TASK2, TASK5, TASK6 use.

Figure 2:
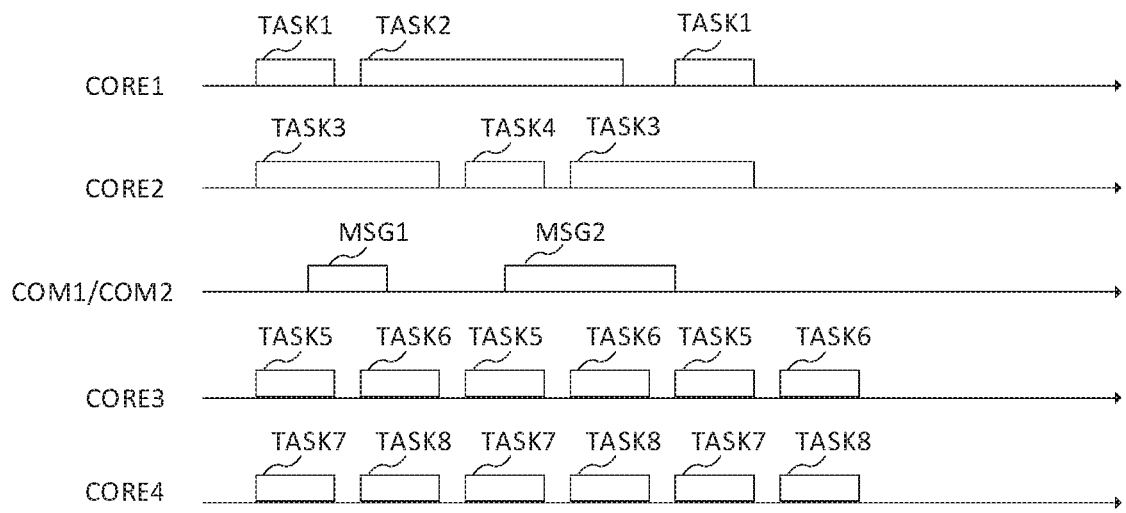
FIG. 2 an example of how to use the time-triggered paradigm.

FIG. 2 depicts an example scenario of the execution of tasks TASK1-TASK8 in the example structure of the, in particular highly-integrated. ECU device HI-ECU1 depicted in FIG. 1. FIG. 2 depicts an example scenario of the execution of tasks TASK1-TASK8 (and several instances thereof) on the cores CORE1-CORE4 of the system-on-chips SOC1, SOC2. Furthermore communication in form of messages MSG1, MSG2 is presented in FIG. 2. Message MSG1 may be a communication from one or many of the tasks TASK1-TASK4 of the system-on-chip SOC1 to one or many of the tasks TASK5-TASK8 on the other system-on-chip SOC2. Message MSG2 may be a message communicated from one or many of tasks TASK5-TASK8 executed on system-on-chip SOC2 to one or many of the tasks TASK1-TASK4 on system-on-chip SOC1.

The use of the time-triggered paradigm relates to the scheduling decisions when tasks start to execute and/or when messages start to transmit. According to the use of the time-triggered paradigm it may be provided that two or more cores CORE1-CORE8 in two or more system-on-chips SOC1-SOC4 have access to a synchronized time, in particular to a data structure that represents a synchronized time, and start to execute two or more tasks TASK1-TASK12 at configured points in time with respect to said synchronized time, wherein the points in time with respect to said synchronized time at which points in time at least two tasks TASK1-TASK12 start to execute are configured, for example in memory MEM and/or storage STORAGE of the ECU device HI-ECU1, and/or—for example—in local memories of the system-on-chips SOC1-SOC4, and/or two or more cores CORE1-CORE8 in two or more system-on-chips SOC1-SOC4 have access to a synchronized time, in particular to a data structure that represents a synchronized time, and may start to transmit one, two, or more messages MSG1, MSG2 at configured points in time with respect to said synchronized time, wherein the points in time with respect to said synchronized time at which points in time one, two, or more messages MSG1, MSG2 start to transmit may be configured, for example in memory MEM and/or storage STORAGE of the ECU device HI-ECU1, and/or—for example—in local memories of the system-on-chips SOC1-SOC4.

In order to enable the execution of tasks TASK1-TASK12 according to the time-triggered paradigm as outlined above it may be necessary to also schedule activities of the virtual machine monitors VVM1, VMM2, and/or virtual machines VM-A, VM-B, VM-C, VM-D with respect to said synchronized time.

It is one of the objective of the invention to integrate automotive applications from different automotive domains. Such automotive domains are for example: autonomous driving, gateway, connectivity, infotainment, body, energy, chassis, and powertrain. Thus, in the example configuration presented in FIG. 2, tasks TASK1, TASK2 may be tasks that realize an autonomous driving domain application, task TASK3 may be a task of a body domain application, task TASK5 may be a task of an infotainment domain application, and tasks TASK6, TASK7 may be part of a powertrain domain application. Tasks TASK4, TASK8 may be infrastructure software functions and task TASK4 may be a shared service. In general the, in particular highly-integrated, automotive ECU device HI-ECU1 is prepared to allow any such combinations of tasks from different domains and infrastructure software functions.

Figure 3:
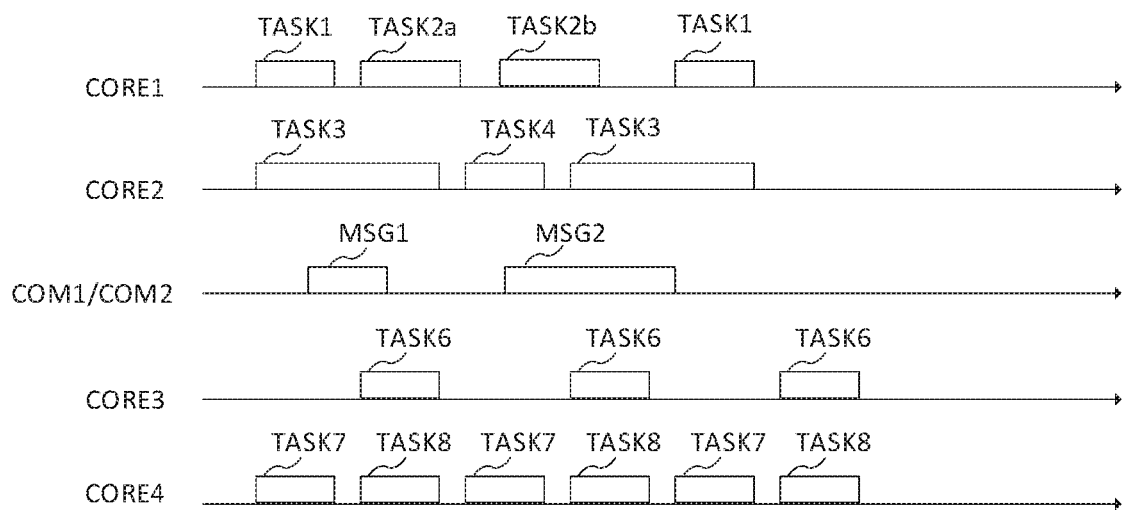
FIG. 3 an example of an effect of a shared management task.

FIG. 3 depicts an example of an effect of a shared service task TASK4. In this example scenario the shared service task TASK4 reacts to a first and a second update request from outside the vehicle. Said first update request instructs the highly-integrated automotive ECU device HI-ECU1 to replace task TASK2 (as shown in FIG. 2) by two new tasks TASK2a, TASK2b and said second update request instructs HI-ECU1 to stop the execution of task TASK5 on core CORE3. As task TASK4 resides on system-on-chip SOC1, it may be task TASK4 itself that executes the update request to stop task TASK2 and to start tasks TASK2a, TASK2b. Task TASK4 may then forward said second update request to task TASK8 that causes to stop the execution of task TASK5 on system-on-chip SOC2. Starting and stopping of tasks are only examples of update requests. Update requests may also cover modifications and re-configurations of tasks of infrastructure software functions and/or automotive applications.

Figure 4:
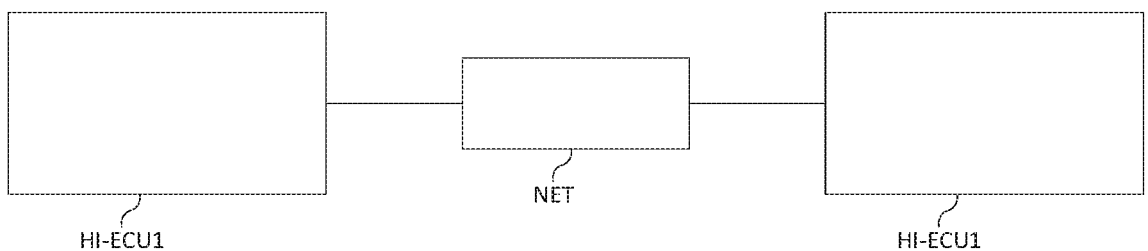
FIG. 4 an example automotive architectures leveraging two highly-integrated ECU device connected by a network.

FIG. 4 depicts two highly-integrated automotive ECU devices HI-ECU1, as shown for example in FIG. 1, connected to each other by means of a network NET. An automobile may implement more than one ECU device HI-ECU1 for fault-tolerance and dependability reasons. I.e., in the case of a failure of one of the HI-ECU1 a second HI-ECU1 is ready to perform the intended functionality. Said first and said second ECU device HI-ECU1 are connected to each other with a network NET. Such a network may in itself provide fault-tolerance properties, e.g., redundant links and switches and said first and said second ECU device HI-ECU1 may also connect to the network NET with redundant links. Said first and said second ECU device HI-ECU1 may be configured to execute the same or different sets of tasks. Alternatively to a first and a second ECU device HI-ECU1, the automobile may only implement a first ECU device HI-ECU1 and another highly-integrated automotive ECU device HI-ECU2. Said first ECU device HI-ECU1 and said ECU device HI-ECU2 may differ in their software architecture SWARCH1 and/or in their hardware architecture HWARCH1.

The network NET may be for example realized by one or a combinations of the following technologies: Ethernet, PCIe, CAN, LIN, FlexRay, MOST, or any other communication technology.

That which is claimed is:

1. A method, comprising:
   integrating infrastructure software functions and automotive applications on an automotive ECU device (HI-ECU1),
   wherein the ECU device (HI-ECU1) comprises a hardware architecture (HWARCH1) and a software architecture (SWARCH1),
   wherein the hardware architecture (HWARCH1) comprises two or more system-on-chips (SOC1-SOC4),
   wherein at least two of said system-on-chips (SOC1-SOC4) each comprise two or more processing cores (CORE1-CORE8) and means to communicate (COM1-COM2) with at least one other system-on-chip,
   wherein the hardware architecture (HWARCH1) comprises memory (MEM) and means to communicate (COM) with other ECU devices (HI-ECU1),
   wherein the software architecture (SWARCH1) comprises one or more virtual machine monitors (VMM1, VMM2),
   wherein each of said virtual machine monitors (VMM1, VMM2) executes one or more virtual machines (VM-A, VM-B, VM-C, VM-D),
   wherein at least two of said virtual machines (VM-A, VM-B, VM-C, VM-D) each execute an operating system,
   wherein the operating system executes one or more tasks (TASK1-TASK12),
   wherein the execution of two or more of the tasks (TASK1-TASK12) uses a time-triggered paradigm,
   wherein the tasks (TASK1-TASK12) are tasks of automotive applications from at least two different automotive domains and are tasks of infrastructure software functions,
   wherein according to the use of the time-triggered paradigm:
   two or more cores (CORE1-CORE8) in two or more of the system-on-chips (SOC1-SOC4) have access to a data structure that represents a synchronized time, and start to execute the two or more tasks (TASK1-TASK12) at configured points in time with respect to said synchronized time, wherein the points in time with respect to said synchronized time at which points in time at least two tasks (TASK1-TASK12) start to execute are configured in memory (MEM) and/or storage (STORAGE) of the ECU device (HI-ECU1), and/or in local memories of the system-on-chips (SOC1-SOC4), and/or two or more cores (CORE1-CORE8) in two or more system-on-chips (SOC1-SOC4) have access to the data structure that represents the synchronized time, and start to transmit one or more messages (MSG1, MSG2) at configured points in time with respect to said synchronized time, wherein the points in time with respect to said synchronized time at which points in time one or more messages (MSG1, MSG2) start to transmit are configured in memory (MEM) and/or storage (STORAGE) of the ECU device (HI-ECU1), and/or in local memories of the system-on-chips (SOC1-SOC4), wherein said configured points in time of the two or more tasks are sufficiently different from each other such that the at least two tasks that are being executed on the same core of the system-on-chips will not timely overlap with their execution times, and wherein according to the time-triggered paradigm, in order to enable the execution of tasks (TASK1-TASK12), activities of the virtual machine monitors (VVM1, VMM2), and/or the virtual machines (VM-A, VM-B, VM-C, VM-D) are scheduled with respect to said synchronized time.

2. The method according to claim 1, wherein one or more of said tasks (TASK1-TASK12) realize shared management functions.

3. The method according to claim 1, wherein the communication of two or more of the tasks (TASK1-TASK12) uses the time-triggered paradigm.

4. The method according to claim 1, wherein at least two tasks of said tasks (TASK1-TASK12) that use the time-triggered paradigm are executed on different cores of the same system-on-chips (SOC1-SOC4).

5. The method according to claim 1, wherein at least two tasks of said tasks (TASK1-TASK12) that use the time-triggered paradigm are executed on different system-on-chips (SOC1-SOC4).

6. The method according to claim 1, wherein the virtual machine (VM-A, VM-B, VM-C, VM-D) executes one or more of the tasks directly without the use of the operating system.

7. The method according to claim 1, wherein the use of the time-triggered paradigm relates to the scheduling decisions when the tasks start to execute and when messages start to transmit.

8. An automotive ECU device (HI-ECU1) comprising:
a hardware architecture (HWARCH1) which comprises two or more system-on-chips (SOC1-SOC4); and
a software architecture (SWARCH1),
wherein at least two of said system-on-chips (SOC1-SOC4) each comprise two or more processing cores (CORE1-CORE8) and means to communicate (COM1-COM2) with at least one other system-on-chip,
wherein the hardware architecture (HWARCH1) comprises memory (MEM) and means to communicate (COM) with other ECU devices (HI-ECU1),
wherein the software architecture (SWARCH1) comprises one or more virtual machine monitors (VMM1, VMM2),
wherein each of said virtual machine monitors (VMM1, VMM2) is configured to execute one or more virtual machines (VM-A, VM-B, VM-C, VM-D),
wherein at least two of said virtual machines (VM-A, VM-B, VM-C, VM-D) each are configured to execute an operating system,
wherein the operating system executes one or more tasks (TASK1-TASK12),
wherein the execution of two or more of the tasks (TASK1-TASK12) uses a time-triggered paradigm,
wherein the tasks (TASK1-TASK12) are tasks of automotive applications from at least two different automotive domains and are tasks of infrastructure software functions,
wherein according to the use of the time-triggered paradigm:
two or more cores (CORE1-CORE8) in two or more of the system-on-chips (SOC1-SOC4) have access to a data structure that represents a synchronized time, and start to execute the two or more tasks (TASK1-TASK12) at configured points in time with respect to said synchronized time, wherein the points in time with respect to said synchronized time at which points in time at least two tasks (TASK1-TASK12) start to execute are configured in memory (MEM) and/or storage (STORAGE) of the ECU device (HI-ECU1), and/or in local memories of the system-on-chips (SOC1-SOC4), and/or two or more cores (CORE1-CORE8) in two or more system-on-chips (SOC1-SOC4) have access to the data structure that represents the synchronized time, and start to transmit one or more messages (MSG1, MSG2) at configured points in time with respect to said synchronized time, wherein the points in time with respect to said synchronized time at which points in time one or more messages (MSG1, MSG2) start to transmit are configured in memory (MEM) and/or storage (STORAGE) of the ECU device (HI-ECU1), and/or in local memories of the system-on-chips (SOC1-SOC4), wherein said configured points in time of the two or more tasks are sufficiently different from each other such that the at least two tasks that are being executed on the same core of the system-on-chips will not timely overlap with their execution times, and wherein according to the time-triggered paradigm, in order to enable the execution of tasks (TASK1-TASK12), activities of the virtual machine monitors (VVM1, VMM2), and/or the virtual machines (VM-A, VM-B, VM-C, VM-D) are scheduled with respect to said synchronized time.

9. The device according to claim 8, wherein one or more of said tasks (TASK1-TASK12) realize shared management functions.

10. The device according to claim 8, wherein the communication of two or more of the tasks (TASK1-TASK12) uses the time-triggered paradigm.

11. The device according to claim 8, wherein at least two tasks of said tasks (TASK1-TASK12) that use the time-triggered paradigm are executed on different cores of the same system-on-chips (SOC1-SOC4).

12. The device according to claim 8, wherein at least two tasks of said tasks (TASK1-TASK12) that use the time-triggered paradigm are executed on different system-on-chips (SOC1-SOC4).

13. The device according to claim 8, wherein the virtual machine (VM-A, VM-B, VM-C, VM-D) executes one or more of the tasks directly without the use of the operating system.

14. The device according to claim 8, wherein the use of the time-triggered paradigm relates to the scheduling decisions when the tasks start to execute and when messages start to transmit.

15. A system consisting of the two automotive ECU devices (HI-ECU1) according to claim 11, wherein:
- said ECU devices are connected to each other by means of a network (NET),
- a first automotive ECU device (HI-ECU1) of said at least two ECU devices is configured to execute a first set of automotive applications,
- a second ECU device (HI-ECU2) of said at least two ECU devices is configured to execute a second set of automotive applications, wherein the system is configured such that in the case of a failure of said first automotive ECU device (HI-ECU1) one or more automotive applications of said first set of automotive applications are replaced by the execution of said second set of applications located on said second automotive ECU device (HI-ECU2).

16. The system according to claim 15, wherein a set of automotive applications contains at least one automotive application, and wherein the automotive applications of the first set are different from the automotive applications of the second set.

17. The system according to claim 15, wherein the network (NET) that connects said at least two automotive ECU devices (HI-ECU1) is any one or any combination of an Ethernet network, a PCIe network, a CAN network, a LIN network, a FlexRay network, a MOST network, or any other communication technology.

18. A real-time network comprising the automotive ECU device according to claim 11.

19. An automobile comprising automotive ECU device according to claim 11.

* * * * *